United States Patent [19]

Wakabayashi et al.

[11] Patent Number: 4,515,453
[45] Date of Patent: May 7, 1985

[54] CAMERA HAVING A FLASH UNIT BUILT THEREIN

[75] Inventors: Hiroshi Wakabayashi, Yokohama; Nobuo Okabe, Tokyo; Koichi Daitoku, Sagamihara, all of Japan

[73] Assignee: Nippon Kogaku K.K., Tokyo, Japan

[21] Appl. No.: 608,718

[22] Filed: May 10, 1984

[30] Foreign Application Priority Data

May 14, 1983 [JP] Japan ................................. 58-83502

[51] Int. Cl.³ .......................... G03B 15/03; G03B 3/00
[52] U.S. Cl. ............................ 354/149.1; 354/149.11
[58] Field of Search ............... 354/419, 149.1, 149.11, 354/195.12

[56] References Cited

U.S. PATENT DOCUMENTS

| | | | |
|---|---|---|---|
| 3,373,671 | 3/1968 | Jakob | 354/149.11 |
| 4,171,887 | 10/1979 | Hayata | 354/195.12 X |
| 4,325,621 | 4/1982 | Iwata et al. | 354/149.11 |
| 4,472,042 | 9/1984 | Iwata et al. | 354/419 X |

FOREIGN PATENT DOCUMENTS

| | | | |
|---|---|---|---|
| 50502 | 11/1981 | Japan | 354/149.1 |
| 201525 | 12/1982 | Japan | 354/149.11 |

Primary Examiner—William B. Perkey
Attorney, Agent, or Firm—Fitzpatrick, Cella, Harper & Scinto

[57] ABSTRACT

A camera for exposing a film to the image of an object to be photographed includes housing means, flashlight emitting means having a light-emitting portion for applying light toward the object to be photographed, the light-emitting portion being movable between a first position in which it is projected from the housing means and a second position in which it is received in the housing means, and an optical member provided in the housing means so as to be positioned between the light-emitting portion and the object to be photographed when the light-emitting portion is in the second position, the member having an optical characteristic for an area in which light is applied to the object to be photographed from the light-emitting portion through the optical member to change relative to an area in which light is directly applied to the object to be photographed from the light-emitting portion.

9 Claims, 7 Drawing Figures

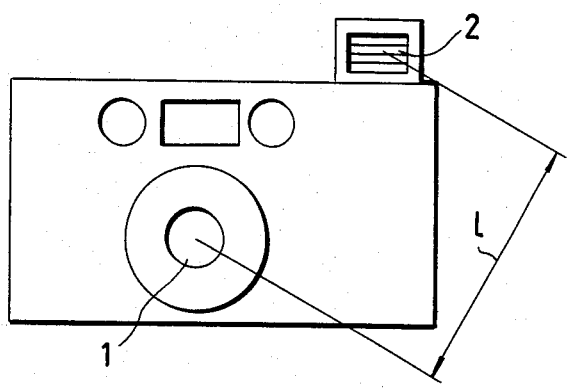
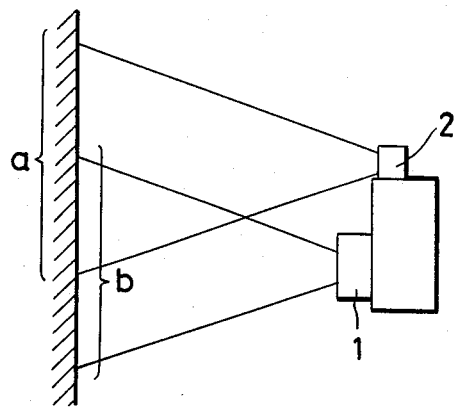
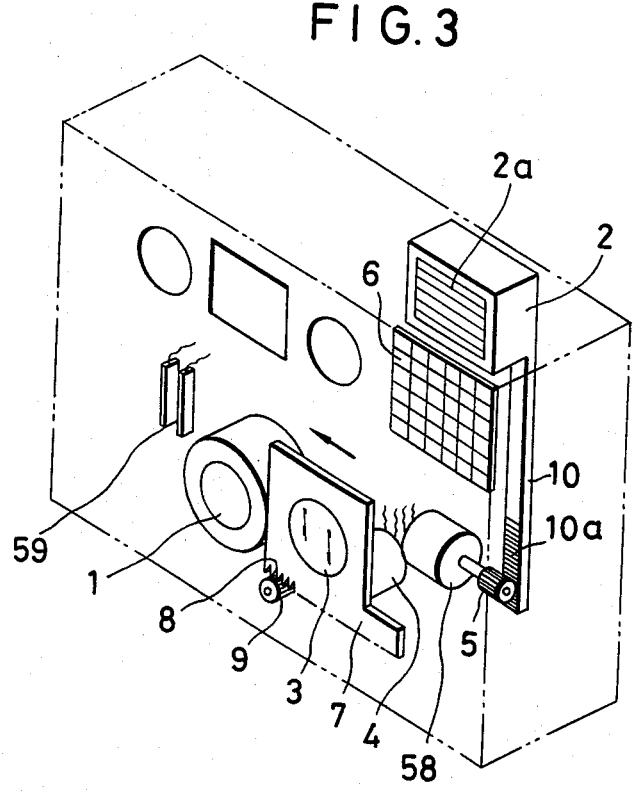

CAMERA HAVING A FLASH UNIT BUILT THEREIN

BACKGROUND OF THE INVENTION

1. Field of the Invention

This invention relates to a camera having an electronic flash unit built therein.

2. Description of the Piror Art

Heretofore, when it has been desired to carry out flashlight photography by an electronic flash unit with ordinary cameras other than special cameras such as cameras exclusively for contact photography, if the object distance is too short, there has been a disadvantage that deviation is created between the application range of light emitted from the electronic flash unit and the photographing range by the photo-taking lens and this caused illumination irregularity on the object to be photographed (see FIG. 2 of the accompanying drawings).

As a camera which overcomes such disadvantage, there is a telephoto change-over camera incorporating an electronic flash unit therein as disclosed in Japanese Utility Model Publication No. 50502/1981. In this example, there is disclosed a technique which enables a light-diffusing plate to be removably inserted into the front of the light-emitting portion of an electronic flash unit in response to the change-over of the focal length of the photo-taking lens in which a particular lens and a lens having a focal length longer than that of the particular lens changed over. However, with a compact, camera, when a human being is to be photographed, if the electronic flash unit emits flashlight when the object distance is too short, there occurs a phenomenon that the pupils of the person's eyes are photographed as shining red. To avoid this, in the front view of FIG. 1 of the accompany drawings, it is recommended that the light-emitting portion 2 be projected so as to be disposed at a position 1 spaced apart as much as possible relative to the photo-taking lens 1. For this purpose, the electronic flash unit and the light-diffusing plate must be moved and therefore, the mechanism becomes complicated. Also, a portion for receiving the light-diffusing plate when it is not used must be provided and this may cause the camera to be bulky against the desire to make the camera compact.

SUMMARY OF THE INVENTION

It is an object of the present invention to provide a camera in which an electronic flash unit is caused to emit light at different positions corresponding to a variation in the optical characteristic such as the focal length of a photo-taking lens and the area of application of light to an object to be photographed differs in accordance with the position of the electronic flash unit.

To achieve the above object, the present invention adopts a structure having a flash unit movable between a received position in which it is received in a camera body and a projected position in which it is projected from the camera body and emitting light at the two positions and an emitted light application characteristic converting plate secured to the camera body in opposed relationship with the light-emitting portion of the flash unit when received in said received position.

The invention will become more fully apparent from the following detailed description thereof taken in conjunction with the accompanying drawings.

BRIEF DESCRIPTION OF THE DRAWINGS

FIG. 1 is a front view of a prior art camera having an electronic flash unit built therein.

FIG. 2 is a view for explaining the disadvantage of the prior art camera.

FIG. 3 is a perspective view of an embodiment of the present invention.

DESCRIPTION OF THE PREFERRED EMBODIMENTS

Figure 4:
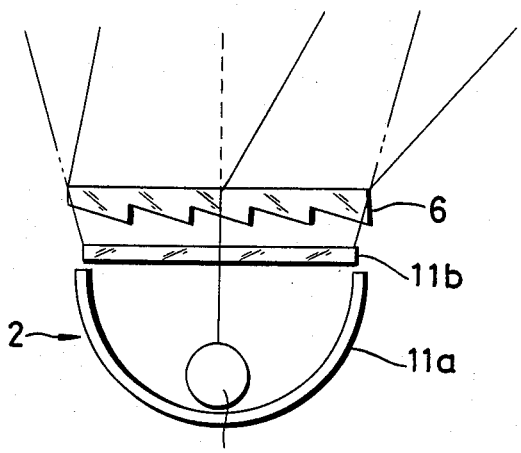
FIG. 4 is a cross-sectional view of the electronic flash unit in the embodiment of FIG. 3.

FIG. 3 is a perspective view of an embodiment of the camera of the present invention which is capable of accomplishing ordinary standard photography and close-up photography.

A rack portion 8 formed in the lower portion of the holding member 7 of a conversion lens 3 for close-up photography and a pinion 9 fixed to the rotary shaft of a motor 4 fixed in the camera are designed to engage each other. By the motor 4 being revolved by a switch, not shown, the holding member 7 of the conversion lens for close-up photography slides leftwardly from its shown position as indicated by the arrow and the conversion lens 3 for close-up photography is inserted into the optical system of a photo-taking lens 1. When this lens 3 for close-up photography is inserted into the photo-taking optical system, a switch 59 is closed with its contact piece pressed by the holding member 7. If the motor 4 is revolved in the reverse direction by a switch, not shown, the conversion lens 3 for close-up photography will escape from photo-taking light rays and returns to its shown position. A pinion 5 fixed to the rotary shaft of a motor 58 and a rack portion 10a provided in the lower portion of an extension 10 secured to one end of an electronic flash unit 2 are designed to engage each other. When the motor 58 fixed in the camera is revolved by the circuit of FIG. 5 which will later be described, the electronic flash unit 2 which is in its projected position lowers through the engagement between the pinion 5 and the rack portion 10a and is received into a recess having dimensions slightly greater than the outer dimensions of the electronic flash unit 2 and provided rearwardly of a Fresnel prism 6 fixed to the front right upper corner of the camera. In the present invention, the electronic flash unit is designed to emit light when it is received into said recess. If the motor 58 revolves in the reverse direction, the electronic flash unit 2 will be moved upwardly.

FIG. 4 is a cross-sectional plan view illustrating the electronic flash unit when the light-emitting portion 2a of the electronic flash unit 2 is positioned rearwardly of the Fresnel prism 6, namely, is in its received position. The light-emitting tube 11 of the electronic flash unit emits light to an object to be photographed through a reflecting mirror 11a and a light-transmitting protective plate 11b. The Fresnel prism 6 has the function of bending the light rays from the light-emitting tube 11 toward the photo-taking lens 1 side (indicated by solid lines) and therefore, in the embodiment of the present invention, the light from the electronic flash unit 2 received rearwardly of the Fresnel prism 6 creates no illumination irregularity on the object to be photographed when it is at a short distance.

In the present embodiment, the insertion of the conversion lens 3 for close-up photography into the phototaking optical system of the photo-taking lens is accomplished electrically, but of course, this may also be accomplished manually.

Further, to avoid the object to be photographed becoming over-exposed because of the light from the electronic flash unit being too intense during close-up photography, the prism 6 is formed by a milky plate so as to attenuate the quantity of light emitted from the electronic flash unit.

Figure 5:
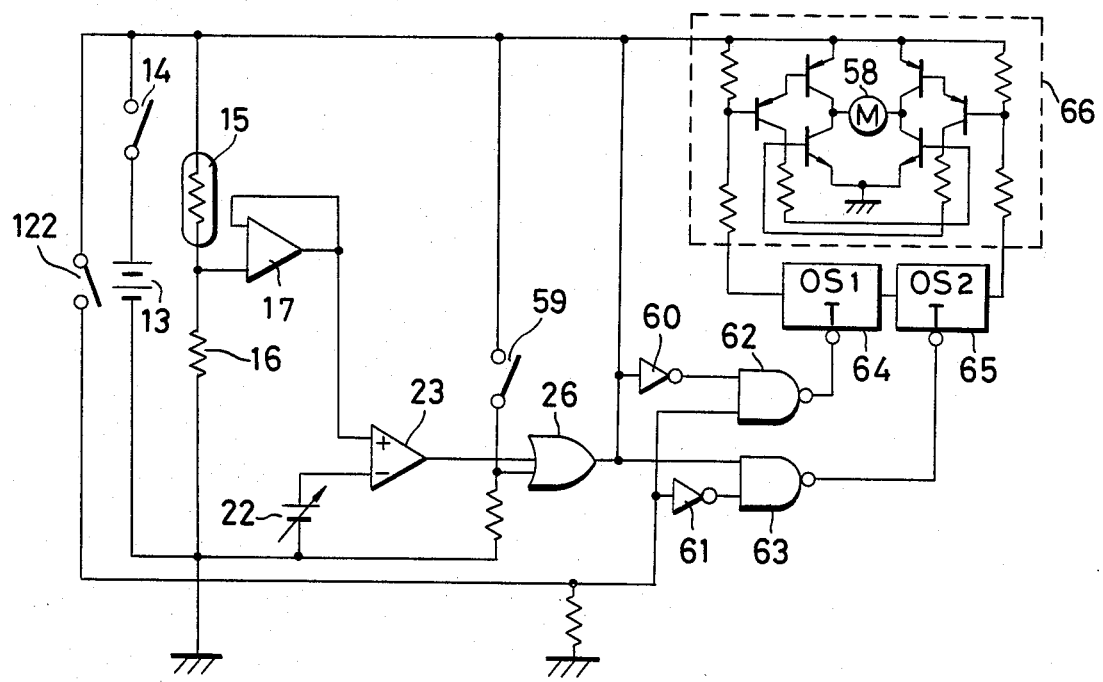
FIG. 5 diagrammatically shows an electric circuit for moving the electronic flash unit upwardly and downwardly.

FIG. 5 shows an electric circuit for moving the electronic flash unit upwardly and downwardly in response to movement of the conversion lens 3 for close-up photography.

In FIG. 5, when a main switch 14 seriesconnected to a power source 13 is closed, a metering circuit comprising cadmium sulfide 15 as a photoelectric conversion element, a resistor 16 and a voltage follower 17 operates.

A comparator 23 compares the output from the metering circuit with the output from a power source 22 and produces a low level (hereinafter referred to as L level) output when the brightness of the object to be photographed is so low that the photography by strobo light emission is necessary, and produces a high level (hereinafter referred to as H level) output when the brightness of the object to be photographed is so high that the photography by strobo light emission is unnecessary. The input terminal of an OR gate 26 is connected to the comparator 23 and switch 59. The output terminal of the OR gate 26 is connected to the input terminal of a NAND gate 63 and to the input terminal of a NAND gate 62 through an inverter 60. The output terminal of the NAND gate 62 is connected to the input terminal of a monostable multivibrator 64, and the output terminal of the NAND gate 63 is connected to the input terminal of a monostable multivibrator 65. The monostable multivibrator 64 produces an L level output for a predetermined period in response to the change of the output of the NAND gate 62 from the H level to the L level. The monostable multivibrator 65 operates similarly to the monostable multivibrator 64. A bridge 66 controls the driving of a motor 58 on the basis of the outputs of the monostable multivibrators 64 and 65. A switch 122 is closed when the electronic flash unit 2 is received in the camera.

(i) The case of contact photography:

When the conversion lens 3 is inserted into the phototaking optical system for the purpose of contact photography, the switch 59 is closed. Therefore, the output of the OR gate 26 assumes H level. If the electronic flash unit 2 is in its projected position, a switch 122 is in its OFF position and the output of the inverter 61 assumes H level. Accordingly, the output of the NAND gate 63 assumes L level and the output of the monostable multivibrator 65 assumes L level. The output of this multivibrator 65 acts on the operating bridge 66 to revolve the motor 58 and move the electronic flash unit downwardly. When the downward movement of the electronic flash unit is completed, that is, when the electronic flash unit is in its received position, the switch 122 becomes closed and therefore, the multivibrator 65 does not operate again. In this case, of course, the time during which the output of the monostable multivibrator 65 is kept at L level is set to the time necessary for the electronic flash unit 2 to be moved downwardly from its projected position to its received position.

When the object to be photographed is dark, that is, when the output of the comparator 23 is at L level, the driving circuit, not shown, of the electronic flash unit operates and therefore, the electronic flash unit which is in its received position emits light with opening of the shutter.

When the object to be photographed is light, that is, when the output of the comparator 23 is at H level, the driving circuit of the electronic flash unit is not actuated and therefore, the electronic flash unit does not emit light with opening of the shutter.

(ii) The case of normal light photography in which the brightness of the object to be photographed is so high that the electronic flash is unnecessary:

The output of the reference voltage circuit 22 corresponding to the hand vibration limit time and the output of the metering circuit 15, 16, 17 variable by the bright incident light from the outside are compared by the comparator 23. In the case of the bright incident light, the output from the comparator 23 is at H level and therefore, the output of the OR gate 26 assumes H level. During normal light photography, if the electronic flash unit is in its projected position, the switch 122 is open and the output of the inverter 61 is at H level and the output of the OR gate 26 is at H level and therefore, the output of the NAND gate 63 assumes L level and the output of the monostable multivibrator 65 assumes L level. The output of this multivibrator 65 acts on the operating bridge 66 to revolve the motor 58 and move the electronic flash unit downwardly. When the downward movement of the electronic flash unit is completed, that is, when the electronic flash unit is in its received position, the switch 122 becomes closed and therefore, the multivibrator 65 does not operate again. When the object to be photographed is light, that is, when the output of the comparator 23 is at H level, the driving circuit of the electronic flash unit is not actuated and therefore, the electronic flash unit does not emit light with opening of the shutter.

(iii) The case of flashlight photography in which the brightness of the object to be photographed is so low that the electronic flash unit is used:

The output of the reference voltage circuit 22 and the output of the metering circuit by dark incident light are compared and the output from the comparator 23 assumes L level.

Where contact photography is not effected, if the electronic flash unit is in its received position, the output of the OR gate 26 is at L level and therefore, the output of the inverter 60 is at H level and the switch 122 is in its ON position and thus, the output of the NAND gate 62 assumes L level and the output of the monostable multivibrator 64 assumes L level. This L level output acts on the operating bridge 66 to revolve the motor 58 in the reverse direction and moves the electronic flash unit upwardly. When the upward movement of the electronic flash unit is completed, that is, when the electronic flash unit is in its projected position, the switch 122 becomes open. By the opening of the switch 122, the input to the monostable multivibrator 64 changes from L level to H level and the motor 58 is stopped.

In this case, of course, the time during which the output of the monostable multivibrator 64 is kept at L level is set to the time necessary for the electronic flash unit to be moved upwardly from its received position to its projected position.

When the shutter is opened, the electronic flash unit which is in its projected position emits light.

Figure 6:
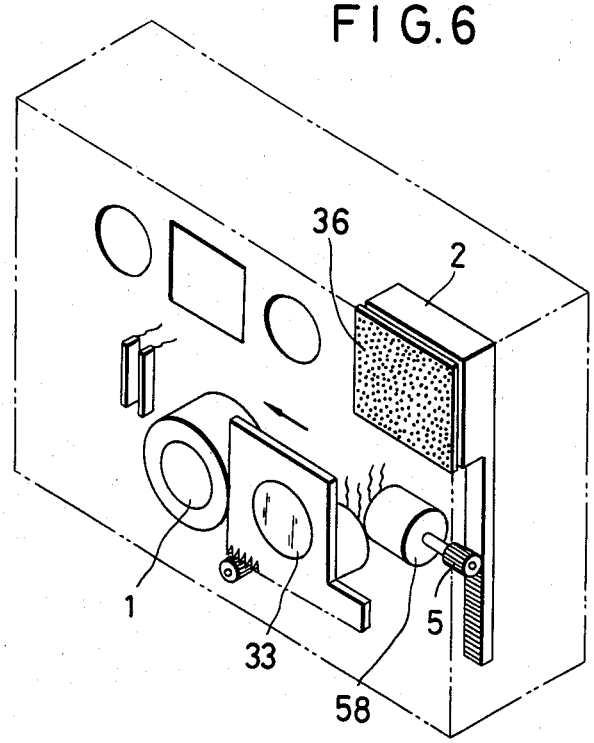
FIG. 6 is a perspective view of another embodiment of the present invention.
Figure 7:
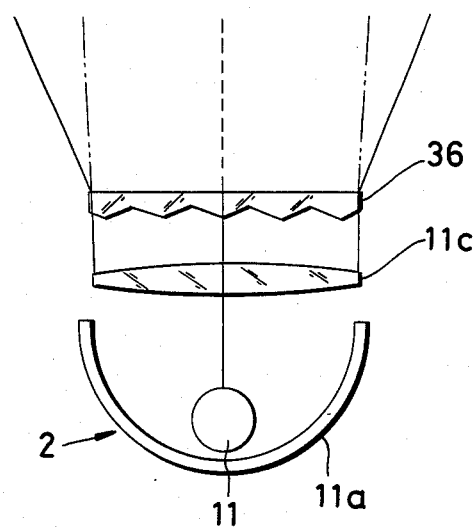
FIG. 7 is a cross-sectional view of the electronic flash unit in the embodiment of FIG. 6.

FIGS. 6 and 7 show another embodiment of the camera of the present invention in which a lens for normal photography and a telephoto lens can be simply changed over. In FIGS. 6 and 7, members similar to those in the previous embodiment are designated by similar reference numerals. Also, in FIG. 6, members similar to those in the previous embodiment, except the lens 1, the electronic flash unit 2 and the light-emitting portion 2a, are given no reference numeral.

FIG. 6 is a perspective view of another embodiment of the present invention. In this embodiment, in the case of normal photography, the electronic flash unit 2 is received in the camera and can emit light toward the object to be photographed through a light-diffusing plate 36. When it is desired to effect photography at an angle of view narrower than that of the lens 1, a conversion lens 33 is moved in the direction of the arrow and inserted into the photo-taking optical system, whereby the electronic flash unit 2 is projected from the camera and can emit light directly to the object to be photographed without the intermediary of the light-diffusing plate 36.

The photo-taking optical system comprising the photo-taking lens 1 and the conversion lens 33 is designed such that the focal length thereof is longer than that of the photo-taking lens 1 and therefore, comparing a case where the conversion lens 33 has been inserted into the photo-taking optical system with a case where the photo-taking optical system is formed only by the photo-taking lens 1, the rate at which the eyes occupy the picture plane when a human face is photographed is greater in the former case. Accordingly, comparing a case where photography is effected with the conversion lens 33 being inserted in the photo-taking optical system and with flashlight being emitted from the electronic flash unit 2 with a case where photography by emitted flashlight is effected with the photo-taking optical system being formed only by the photo-taking lens 1, the aforementioned phenomenon in which the pupil shines red appears more remarkably in the former case. Accordingly, where the conversion lens 33 has been inserted into the phototaking optical system, it is better to project the electronic flash unit 2 from the camera.

FIG. 7 is a cross-sectional plan view illustrating the electronic flash unit when the light-emitting portion 2a of the electronic flash unit 2 is positioned rearwardly of the light-diffusing plate 36, that is, when the electronic flash unit is in its received position. A condenser lens 11c applies the light from a light-emitting tube 11 through a reflecting mirror 11a to the area of the object to be photographed corresponding to the angle of view of the photo-taking optical system when the electronic flash unit 2 has been projected, that is, when flashlight-photography is effected with the conversion lens 33, being inserted in the photo-taking optical system. In a case where photography is effected with the conversion lens 33 being inserted in the photo-taking optical system. In a case where photography is effected with the conversion lens 33 being inserted in the phototaking optical system, there is a tendency to effect photography with the distance to the object to be photographed being made longer than in a case where photography is effected only by the photo-taking lens 1. Accordingly, the condenser lens 3 enables the light from the light-emitting tube 11 through the reflecting mirror 11a to be applied to a more distant object to be photographed. The light-diffusing plate 36 transmits the light passed through the condenser lens 11c to the area of the object to be photographed corresponding to the angle of view of the photo-taking lens 1.

Also, each embodiment of the present invention adopts a construction in which upward and downward movement of the electronic flash unit is effected by revolution of the motor 58 when the conversion lenses 3 and 33 are inserted into the photo-taking optical system, but alternatively, a construction may be adopted in which upward and downward movement of the electronic flash unit 2 is effected in response to axial movement or zooming operation of the photo-taking lens 1.

According to the present invention, a construction is adopted in which the light-diffusing plate or the like is fixed to the camera body and the flash unit is moved to the position of this light-diffusing plate and therefore, a wide range of photography can be accomplished without making the camera bulky or complex.

We claim:

1. A camera for exposing a film to the image of an object to be photographed, including:
   (a) housing means;
   (b) flashlight emitting means having a light-emitting portion for applying light toward the object to be photographed, said light-emitting portion being movable between a first position in which it is projected from said housing means and a second position in which it is received in said housing means; and
   (c) an optical member provided in said housing means so as to be positioned between said light-emitting portion and the object to be photographed when said light-emitting portion is in said second position, said member having an optical characteristic for an area in which light is applied to the object to be photographed from said light-emitting portion through said optical member to change relative to an area in which light is directly applied to the object to be photographed from said light-emitting portion.

2. A camera according to claim 1, wherein said optical member changes the application angle at which light is applied to the object to be photographed from said light emitting portion through said optical member relative to the application angle at which light is directly applied to the object to be photographed from said light-emitting portion.

3. A camera according to claim 1, wherein said optical merber changes the application optical path when light is applied to the object to be photographed from said light-emitting portion through said optical member relative to the application optical path when light is directly applied to the object to be photographed from said light-emitting portion.

4. A camera according to claim 1, wherein said housing means includes a photo-taking lens for forming the image of the object to be photographed on a predtermined plane, and means for varying the optical characteristic of said photo-taking lens so that the photographable area of the surface of the object to be photographed which is conjugate with said predetermined plane varies, and said flashlight emitting means includes means for conveying said light-emitting portion so that said light-emitting portion is moved between said first position and said second position in response to the variation in the optical characteristic of said photo-taking lens.

5. A camera according to claim 4, wherein said optical characteristic varying means varies the focal length of said photo-taking lens, and said conveying means conveys said light-emitting portion toward said first position in response to the focal length of said photo-taking lens becoming longer and conveys said light-emitting portion toward said second position in response to the focal length of said photo-taking lens becoming shorter.

6. A camera according to claim 4, wherein said optical characteristic varying means varies the focusable short distance of said photo-taking lens, and said conveying means conveys said light-emitting portion toward said first position in response to said focusable short distance becoming longer and conveys said light-emitting portion toward said second position in response to said focusable short distance becoming shorter.

7. A camera according to claim 6, wherein said optical member turns the application optical path when light is applied to the object to be photographed from said light emitting portion through said optical member to the direction of the optic axis of said photo-taking lens relative to the application optical path when light is directly applied to the object to be photographed from said light-emitting portion.

8. A camera according to claim 6, wherein said optical member has an optical characteristic that the quantity of light applied to the object to be photographed from said light-emitting portion through said optical member attenuates relative to the quantity of light directly applied to the object to be photographed from said light-emitting portion.

9. A camera for exposing a film to the image of an object to be photographed, including:
 (a) housing means having a photo-taking lens therein;
 (b) flashlight emitting means having a light-emitting portion for applying light toward the object to be photographed, said light-emitting portion being movable between a first position spaced apart from the optic axis of said photo-taking lens by a predetermined distance and a second position spaced apart from the optic axis of said photo-taking lens by more than said predetermined distance; and
 (c) an optical member provided in said housing means so as to be positioned between said light-emitting portion and the object to be photographed when said light-emitting portion is in said first position, said member having an optical characteristic for an area in which light is applied to the object to be photographed from said light-emitting portion through said optical member to change relative to an area in which light is directly applied to the object to be photographed from said light-emitting portion.

* * * * *

UNITED STATES PATENT AND TRADEMARK OFFICE
CERTIFICATE OF CORRECTION

PATENT NO.  : 4,515,453
DATED       : May 7, 1985
INVENTOR(S) : HIROSHI WAKABAYASHI, ET AL.

It is certified that error appears in the above-identified patent and that said Letters Patent is hereby corrected as shown below:

Column 5, lines 59-62, delete "In a case where photography . . . . optical system."

Column 6, line 53, change "merber" to --member--.

Signed and Sealed this

Twenty-seventh Day of August 1985

[SEAL]

Attest:

DONALD J. QUIGG

Attesting Officer

Acting Commissioner of Patents and Trademarks